United States Patent
Zhang et al.

(10) Patent No.: US 11,490,128 B2
(45) Date of Patent: Nov. 1, 2022

(54) DEEP NEURAL NETWORK (DNN)-BASED RECONSTRUCTION METHOD AND APPARATUS FOR COMPRESSIVE VIDEO SENSING (CVS)

(71) Applicant: NANJING UNIVERSITY OF POSTS AND TELECOMMUNICATIONS, Jiangsu (CN)

(72) Inventors: Dengyin Zhang, Nanjing (CN); Chao Zhou, Jiangsu (CN); Can Chen, Jiangsu (CN); Junjiang Li, Jiangsu (CN); Zijie Liu, Jiangsu (CN)

( * ) Notice: Subject to any disclaimer, the term of this patent is extended or adjusted under 35 U.S.C. 154(b) by 0 days.

(21) Appl. No.: 17/262,830

(22) PCT Filed: Aug. 17, 2020

(86) PCT No.: PCT/CN2020/109432
§ 371 (c)(1),
(2) Date: Jan. 25, 2021

(87) PCT Pub. No.: WO2021/093393
PCT Pub. Date: May 20, 2021

(65) Prior Publication Data
US 2022/0030281 A1  Jan. 27, 2022

(30) Foreign Application Priority Data
Nov. 13, 2019  (CN) .......................... 201911104216.1

(51) Int. Cl.
*H04N 19/176*  (2014.01)
*G06F 17/16*  (2006.01)
(Continued)

(52) U.S. Cl.
CPC ............. *H04N 19/90* (2014.11); *G06F 17/16* (2013.01); *G06N 3/08* (2013.01); *H04N 19/176* (2014.11)

(58) Field of Classification Search
CPC ........ G06F 17/16; G06N 3/08; H04N 19/103; H04N 19/136; H04N 19/172; H04N 19/176; H04N 19/59; H04N 19/90
(Continued)

(56) References Cited

U.S. PATENT DOCUMENTS

| | | | |
|---|---|---|---|
| 10,924,755 B2 * | 2/2021 | Ren | ...................... G06N 3/0454 |
| 2019/0266409 A1 * | 8/2019 | He | .......................... G06V 20/49 |
| 2020/0267416 A1 * | 8/2020 | Hodgkinson | .......... H04N 19/80 |

* cited by examiner

*Primary Examiner* — Christopher S Kelley
*Assistant Examiner* — Kathleen M Walsh

(57) ABSTRACT

The present disclosure provides a deep neural network (DNN)-based reconstruction method and apparatus for compressive video sensing (CVS). The method divides a video signal into a key frame and a non-key frame. The key frame is reconstructed by using an existing image reconstruction method. The non-key frame is reconstructed by using a special DNN according to the present disclosure. The neural network includes an adaptive sampling module, a multi-hypothesis prediction module, and a residual reconstruction module. The neural network makes full use of a spatio-temporal correlation of the video signal to sample and reconstruct the video signal. This ensures low time complexity of an algorithm while improving reconstruction quality. Therefore, the method in the present disclosure is applicable to a video sensing system with limited resources on a sampling side and high requirements for reconstruction quality and real-time performance.

15 Claims, 4 Drawing Sheets

(51) Int. Cl.
*H04N 19/90* (2014.01)
*G06N 3/08* (2006.01)
(58) Field of Classification Search
USPC .................................................. 375/240.12
See application file for complete search history.

DEEP NEURAL NETWORK (DNN)-BASED RECONSTRUCTION METHOD AND APPARATUS FOR COMPRESSIVE VIDEO SENSING (CVS)

RELATED APPLICATIONS

This is a U.S. national stage of international application No. PCT/CN2020/109432 filed on Aug. 17, 2020, which claims priority to Chinese Patent Application No. 201911104216.1, filed with the China National Intellectual Property Administration (CNIPA) on Nov. 13, 2019 and entitled "DEEP NEURAL NETWORK (DNN)-BASED RECONSTRUCTION METHOD AND APPARATUS FOR COMPRESSIVE VIDEO SENSING (CVS)", which is incorporated herein by reference in its entirety.

TECHNICAL FIELD

The present disclosure relates to the technical field of video processing, and in particular, to a DNN-based reconstruction method and apparatus for CVS.

BACKGROUND

With the dramatic development of information society, increasing requirements are imposed on the sampling and processing with high-dimensional signals such as images and videos. In conventional video sampling systems, a video sensor usually first samples plenty of redundant video signals according to the Nyquist-Shannon sampling theorem, and then compresses the signals on an encoder side through video compressing coding to reduce transmission bandwidth and storage pressure. However, this method causes a huge waste of sampling resources. In addition, highly complicated compressing encoding methods cannot be used in some applications with limited resources on the encoder side, for example, wireless video sensing networks (WVSNs). In recent years, CVS methods have been widely applied to the WVSNs. In a framework of CVS, an encoder usually employs a sensing device such as a single pixel camera to integrate sampling and compression into a low-complexity linear projection, which produces much fewer measurements than those required by the Nyquist-Shannon sampling theorem. On a decoder side, a proper reconstruction algorithm is used to recover these measurements to obtain the original video signal.

Existing CVS systems usually recover video signals by optimization-based reconstruction algorithms. Specifically, optimization-based algorithms generally use some prior knowledge (for example, sparsity, model sparsity, low-rank performance, and non-local similarity) of video signals to design a convex optimization problem. However, the convex optimization problem is usually solved in an iterative and highly-complicated manner, resulting in a long reconstruction time. Typically, these kinds of methods usually take several seconds or even several minutes to restore a video frame with a resolution of 352*288. This makes it difficult to play the video on the decoder side in real time. Therefore, this method cannot satisfy the real-time requirement in a wireless sensor network. In addition, the prior knowledge used in the optimization method is artificially designed, and can only roughly describe features of the signal. Video signals in nature are usually more complicated. Therefore, an optimization-based reconstruction method cannot ensure good reconstruction quality. As a result, reconstructed videos are blurred and even ghosting occurs, causing poor user experience.

SUMMARY

In view of this, the present disclosure aims to provide a DNN-based reconstruction method and apparatus for CVS used in WVSNs with limited resources on an encoder side, to resolve problems that a delay is large and quality of a reconstructed video is poor in existing video reconstruction methods.

To achieve the foregoing objective, the present disclosure provides a DNN-based reconstruction method for CVS. The method includes:

constructing a non-key-frame reconstruction module configured to reconstruct a non-key video frame, including construction of an adaptive sampling module, a multi-hypothesis prediction module, and a residual reconstruction module.

A specific method includes:

obtaining a video sequence used for DNN training; dividing the video sequence used for DNN training into a plurality of training-specific groups of pictures (GOP), and determining a training-specific key frame and a training-specific non-key frame for each training-specific GOP; reconstructing the training-specific key frame by using a CVS reconstruction method, to obtain a reconstructed training-specific key frame; and dividing the training-specific non-key frame into a plurality of image blocks that do not overlap each other;

constructing the adaptive sampling module, specifically including: performing adaptive sampling on each image block in the training-specific non-key frame, to obtain measurements of the image block;

constructing the multi-hypothesis prediction module, specifically including: determining a set of hypothesis blocks corresponding to each image block in the training-specific non-key frame, performing adaptive sampling on each hypothesis block corresponding to the image block, to obtain measurements of the hypothesis block, and calculating a multi-hypothesis prediction of each image block based on the measurements of the hypothesis block and the measurements of the image block to obtain a multi-hypothesis predicted image;

constructing the residual reconstruction module, specifically including: performing adaptive sampling on the multi-hypothesis predicted image to obtain measurements of the multi-hypothesis predicted image, constructing residual measurements between the measurements of the multi-hypothesis predicted image and measurements of the non-key frame, and obtaining a reconstruction value of the non-key frame based on the residual measurements by using a residual reconstruction method, where the measurements of the non-key frame include measurements of all image blocks in the training-specific non-key frame;

cascading the constructed adaptive sampling module and the constructed multi-hypothesis prediction module to construct a sub-network; pre-training the sub-network by using the training-specific non-key frame and the reconstructed training-specific key frame as inputs, the multi-hypothesis predicted image as an output, and the training-specific non-key frame as a label; and training an entire DNN by using, as initial values, parameters obtained by pre-training the sub-network, the training-specific non-key frame and the reconstructed training-specific key frame as the inputs, the reconstruction value of the non-key frame as the output, and the training-specific non-key frame as the label, to obtain a trained DNN;

inputting a to-be-reconstructed video sequence, dividing the to-be-reconstructed video sequence into a plurality of to-be-reconstructed GOPs, determining a to-be-reconstructed key frame and a to-be-reconstructed non-key frame for each to-be-reconstructed GOP, and reconstructing the to-be-reconstructed key frame to obtain a reconstructed key frame;

reconstructing the to-be-reconstructed non-key frame of the to-be-reconstructed video sequence by using the trained DNN, to output a reconstructed non-key frame; and arranging, in sequence, the reconstructed key frame and the reconstructed non-key frame output by the DNN, to obtain a reconstructed video signal.

Optionally, the determining a set of hypothesis blocks corresponding to each image block in the non-key frame specifically includes:

for each b·b image block in the training-specific non-key frame, determining, in the training-specific key frame, a W×W rectangular search window centered on a position in which a center point of the b·b image block is located, extracting, as hypothesis blocks of a current image block, all overlapping image blocks in the search window, and combining all hypothesis blocks of each image block in the training-specific non-key frame to obtain an h×w×(b·b)×n hypothesis block tensor, where n represents the number of hypothesis blocks corresponding to each image block, h×w represents the number of to-be-predicted image blocks, each frame is divided into h image blocks in a height direction and w image blocks in a width direction, b·b represents dimensions of a hypothesis block, and b represents a side length of the hypothesis block.

Optionally, the multi-hypothesis prediction of each image block is calculated according to the following formula:

$$P_i = \sum_{\forall j} \omega_{i,j} h_{i,j}$$

$$= \frac{1}{\sum_{\forall j} e^{p(q_{i,j})^T p(y_i)}} \sum_{\forall j} e^{p(q_{i,j})^T p(y_i)} h_{i,j}$$

where $P_i$ represents a prediction result of the $i^{th}$ image block in a current training-specific non-key frame, $h_{i,j}$ represents the $j^{th}$ hypothesis block of the $i^{th}$ image block, $\omega_{i,j}$ represents a weight of the hypothesis block, $q_{i,j}$ represents measurements obtained by performing adaptive sampling on the hypothesis block, $y_i$ represents measurements of the $i^{th}$ image block, and p(•) represents a nonlinear mapping function used to convert low-dimensional measurements into high-dimensional measurements.

Optionally, the formula for calculating the multi-hypothesis prediction of the image block is specifically implemented as follows:

performing adaptive sampling on the hypothesis block tensor to obtain an h×w×(sampling rate (SR)·b·b)×n tensor including measurements $q_{i,j}$ of all hypothesis blocks of each image block, where SR·b·b represents dimensions of the measurements $q_{i,j}$ of the hypothesis block;

implementing the p(•) function by using three convolutional layers, where the three convolutional layers each have a 1×1 convolution kernel and b·b output channels, the first convolutional layer has SR·b·b input channels and the other convolutional layers each have b·b input channels, and the SR represents an SR of the non-key frame;

converting, by using the p(•) function, the obtained tensor including the measurements of the hypothesis blocks into an h×w×(b·b)×n hypothesis block feature map;

performing, by using the p(•) function, convolution on an obtained h×w×(SR·b·b) tensor of the measurements of the non-key frame, to obtain an h×w×(b·b) non-key-frame feature map, where the measurements of the non-key frame are obtained based on the measurements of the image block;

performing matrix multiplication on the hypothesis block feature map and the non-key-frame feature map to implement $$e^{p(q_{i,j})^T p(y_i)},$$

to obtain an h×w×n tensor;

normalizing, by using a softmax function, the last dimension of the obtained tensor to implement $$\frac{1}{\sum_{\forall j} e^{p(q_{i,j})^T p(y_i)}} \sum_{\forall j} e^{p(q_{i,j})^T p(y_i)},$$

to obtain an h×w×n coefficient tensor;

performing matrix multiplication on the hypothesis block tensor and the coefficient tensor to obtain an h×w×(b·b) prediction tensor; and transforming the prediction tensor to obtain an (h·b)×(w·b) multi-hypothesis predicted image of the current training-specific non-key frame.

Optionally, a weight of each hypothesis block is determined by an embedded Gaussian function, and is specifically obtained according to the following formula:

$$\omega_{i,j} = \frac{e^{p(q_{i,j})^T p(y_i)}}{\sum_{\forall j} e^{p(q_{i,j})^T p(y_i)}}$$

Optionally, the constructing the residual reconstruction module specifically includes:

performing adaptive sampling on the multi-hypothesis predicted image to obtain the h×w×(SR·b·b) measurements of the multi-hypothesis predicted image;

performing subtraction on the measurements of the multi-hypothesis predicted image and the measurements that are of the non-key frame and that are obtained based on the measurements of the image block, to obtain residual measurements;

converting the residual measurements into an h×w×(b·b) feature map by using one convolutional layer, where the convolutional layer has a 1×1 convolution kernel, SR·b·b input channels, and b·b output channels;

transforming the feature map obtained through conversion, to obtain a transformed (h·b)×(w·b) feature map;

performing convolution on the transformed feature map by using a convolutional layer to obtain a reconstruction result of a residual image; and adding the reconstruction result of the residual image and the multi-hypothesis predicted image to output the reconstruction value of the non-key frame.

Optionally, convolution is performed on the transformed feature map by using eight convolutional layers, to obtain the reconstruction result of the residual image, where the eight convolutional layers each have a 3×3 convolution kernel, the first convolutional layer has one input channel and the other convolutional layers each have 64 input channels, and the last convolutional layer has one output channel and the other convolutional layers each have 64 output channels.

Optionally, an adaptive sampling method includes:
sampling a signal according to the following formula:

$$y=\Phi x$$

where y represents a vector of measurements, Φ represents a sampling matrix, and x represents an original signal; the foregoing formula is implemented by using one convolutional layer, and the convolutional layer has a b×b convolution kernel, one input channel, and SR·b·b output channels; and the convolutional layer is equivalent to performing compressive sensing-based sampling on each b×b image block in an image to output an h×w×(SR·b·b) tensor, where h and w represent quantities of blocks of the input image in height and width dimensions respectively, and weights of the convolutional layer are a corresponding sampling matrix.

Optionally, the key frame is reconstructed by using a DNN-based reconstruction method for CVS.

The present disclosure further provides a DNN-based Apparatus for CVS. The apparatus includes:

a video sequence input module, a non-key-frame reconstruction module, a GOP division module, a key-frame reconstruction module, and a video signal reconstruction and output module, where the video sequence input module is configured to input a to-be-reconstructed video sequence;

the GOP division module is configured to divide the to-be-reconstructed video signal sequence input by the video sequence input module into a plurality of GOPs, and determine a to-be-reconstructed key frame and a to-be-reconstructed non-key frame for each GOP;

the non-key-frame reconstruction module is configured to reconstruct the to-be-reconstructed non-key frame obtained by the GOP division module through division, to obtain a reconstructed non-key frame;

the key-frame reconstruction module is configured to reconstruct, by using a CVS reconstruction method, the to-be-reconstructed key frame obtained by the GOP division module through division, to obtain a reconstructed key frame;

the video signal reconstruction and output module is configured to arrange, in sequence, the reconstructed key frame output by the key-frame reconstruction module and the reconstructed non-key frame output by the non-key-frame reconstruction module, to obtain a reconstructed video signal;

the non-key-frame reconstruction module includes an image block division submodule, an adaptive sampling submodule, a multi-hypothesis prediction submodule, a residual reconstruction submodule, a sub-network training submodule, and a DNN training submodule, where the adaptive sampling submodule, the multi-hypothesis prediction submodule, and the residual reconstruction submodule constitute the end-to-end DNN;

the video sequence input module is configured to input a training-specific video sequence;

the GOP division module is configured to divide the training-specific video sequence input by the video sequence input module into a plurality of GOPs, and determine a training-specific key frame and a training-specific non-key frame for each GOP;

the image block division submodule is configured to divide the training-specific non-key frame that is of the training-specific video sequence and that is obtained by the GOP division module into a plurality of image blocks that do not overlap each other;

the adaptive sampling submodule is configured to perform adaptive sampling on each image block in the training-specific non-key frame, to obtain measurements of the image block;

the multi-hypothesis prediction submodule is configured to determine a set of hypothesis blocks corresponding to each image block, perform adaptive sampling on each image block in the training-specific non-key frame by using a corresponding hypothesis block, to obtain measurements of the hypothesis block, and obtain a multi-hypothesis predicted image based on the measurements of the hypothesis block, the measurements of the image block, and an original value of the hypothesis block;

the residual reconstruction submodule is configured to perform adaptive sampling on the multi-hypothesis predicted image, construct residual measurements between measurements of the multi-hypothesis predicted image and measurements of the non-key frame, and obtain a reconstruction value of the non-key frame based on the residual measurements by using a residual reconstruction method, where the measurements of the non-key frame include measurements of all image blocks in the training-specific non-key frame;

the sub-network training submodule is configured to cascade the adaptive sampling submodule and the multi-hypothesis prediction submodule to construct a sub-network, and train the sub-network; and the DNN training submodule is configured to train the entire DNN by using, as initial values, parameters obtained by pre-training the sub-network, to obtain a trained DNN.

According to specific embodiments of the present disclosure, the present disclosure has the following technical effects:

The present disclosure provides the DNN-based reconstruction method and apparatus for CVS. The constructed DNN includes the adaptive sampling module, the multi-hypothesis prediction module, and the residual reconstruction module. Owing to characteristics of the DNN, this method greatly reduces a reconstruction time of the video signal, thereby satisfying real-time performance of the video signal. In addition, the network learns, from training data, how to use a temporal correlation and a spatial correction of the video signal to improve reconstruction quality of the video signal. The proposed DNN uses the reconstructed key frame and the measurements of current non-key frame as inputs and a reconstructed signal of the non-key frame as an output. After parameters of the network are properly trained, the adaptive sampling module of the network is applied to an encoding node in a wireless sensor network, and the multi-hypothesis prediction module and the residual reconstruction module are applied to a decoder side in the wireless sensor network, to restore the video signal in a low-delay and high-quality manner.

In the present disclosure, the adaptive block sampling method is used to retain valid information and delete or reduce redundant information in a sampling process. In addition, a block instead of an image is sampled, reducing the storage and operation burden of the video encoder side.

An obtained residual is easier to reconstruct because of lower signal energy compared with the original frame.

The present disclosure makes full use of the DNN to perform multi-hypothesis prediction on a video frame. A weight of each hypothesis is obtained by learning the training data, so that a prediction result is more accurate.

The present disclosure makes full use of the DNN to perform residual reconstruction. Convolution is performed on the entire residual image by using a learnable convolutional layer, thereby reducing blocking artifacts, extending a receptive field, and improving reconstruction quality.

In the present disclosure, adaptive sampling, multi-hypothesis prediction, and residual reconstruction are implemented by using the constructed neural network. The DNN has low time complexity. Therefore, an algorithm of the method provided in the present disclosure is of low complexity and has a fast reconstruction speed, and can satisfy the real-time performance.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The technical solutions in the embodiments of the present disclosure are clearly and completely described below with reference to the accompanying drawings in the embodiments of the present disclosure. Apparently, the described embodiments are only a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a DNN-based reconstruction method and apparatus for CVS used in WVSNs with limited resources on an encoder side, to resolve problems that a delay is large and quality of a reconstructed video is poor in an existing video reconstruction method.

To make the objective, features, and advantages of the present disclosure more obvious and comprehensive, the following further describes in detail the present disclosure with reference to the accompanying drawing and specific implementations.

The present disclosure is described in detail below with reference to specific embodiments.

Figure 1:
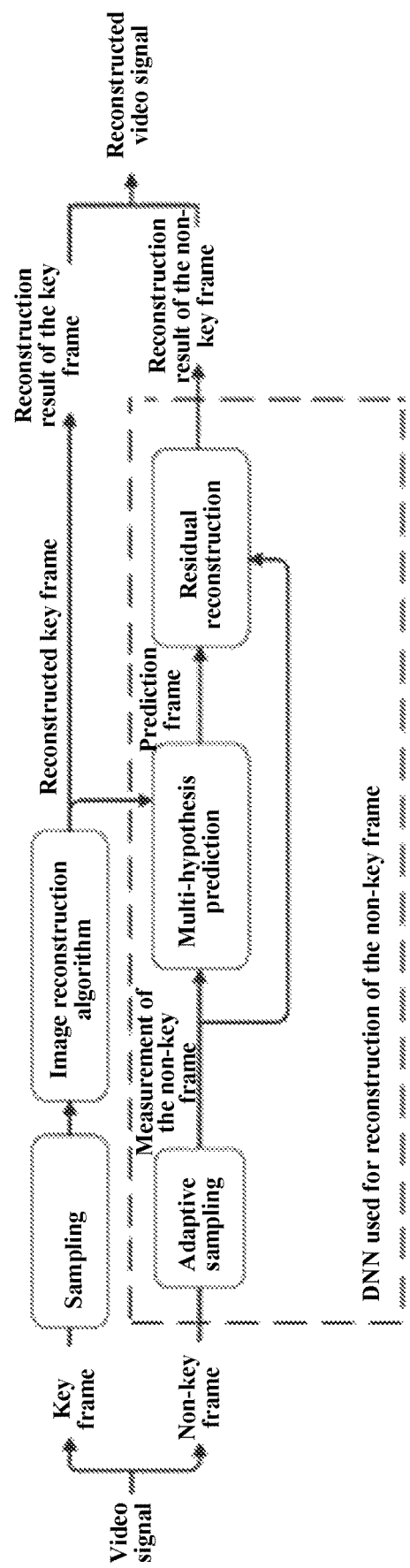
FIG. 1 shows a framework of a DNN-based reconstruction method for CVS according to an embodiment of the present disclosure.

As shown in FIG. 1, the present disclosure provides a DNN-based reconstruction method for CVS. The method specifically includes the following steps.

Parameter setting: An SR of a non-key frame is 0.01, 0.04, or 0.10, a block size b is 33, and a search window size W is 45×45.

(1) Sample a high-quality video sequence used for network training.

(2) Divide the training-specific video signal sequence into a plurality of GOPs. For each GOP, the first frame is a key frame with a high SR, and other frames are non-key frames that have a lower SR than the key frame. The key frame has good reconstruction quality because of the high SR, and is used to guide reconstruction of the non-key frame.

(3) Reconstruct the key frame by using an existing CVS reconstruction method. A specific implementation method is known in the art. Preferably, to reduce a reconstruction time of an entire video, the key frame is reconstructed by using a DNN-based reconstruction method for CVS such as $DR^2$-Net, or ReconNet and $DR^2$-Net in the present disclosure. A specific implementation method is known in the art.

Figure 2:
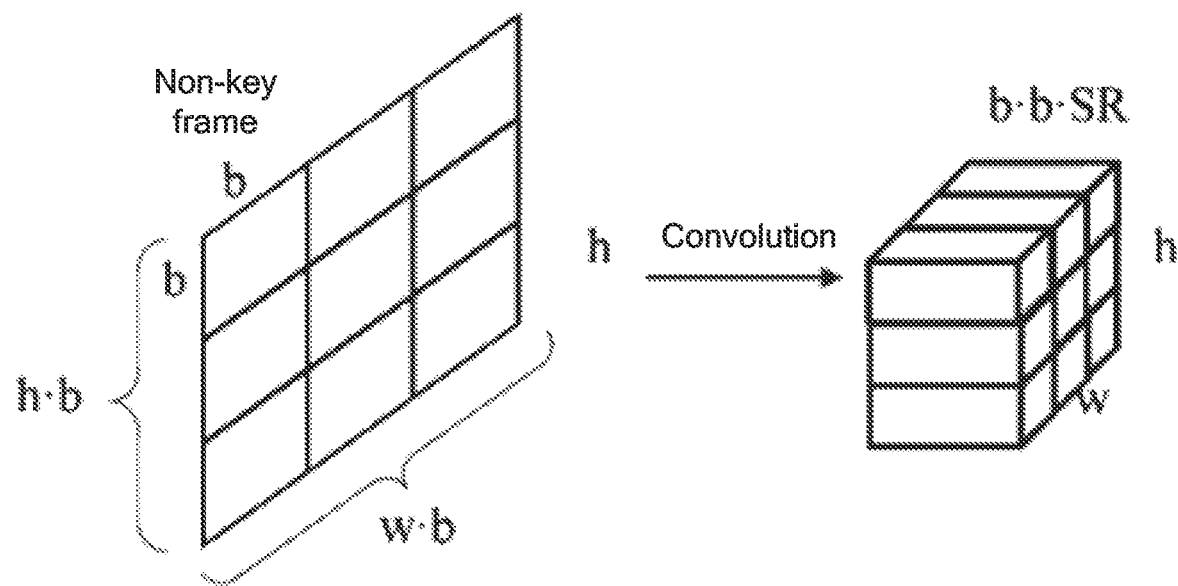
FIG. 2 is a schematic diagram of an adaptive sampling module according to an embodiment of the present disclosure.

(4) Construct an adaptive sampling module of a CVS network, as shown in FIG. 2. In compressive sensing, a signal is sampled according to the following formula:

$$y=\Phi x \quad (3)$$

In the foregoing formula, y represents a vector of measurements, $\Phi$ represents a sampling matrix, and x represents an original signal. In this network, the formula (3) is implemented by using one convolutional layer, and is used to sample the non-key frame. Specifically, the convolutional layer has a b×b convolution kernel, one input channel, and SR·b·b output channels. The SR represents the SR of the non-key frame.

The convolutional layer is equivalent to performing compressive sensing-based sampling on each b×b image block in an image to output an h×w×(SR·b·b) tensor, where h and w represent quantities of blocks of the non-key frame in height and width dimensions respectively (in other words, are obtained by dividing the height and the width of the non-key frame by b respectively). Weights of the convolutional layer are a corresponding sampling matrix. Parameters of the convolutional layer can be trained. Therefore, adaptive sampling is used in this network.

Figure 4:
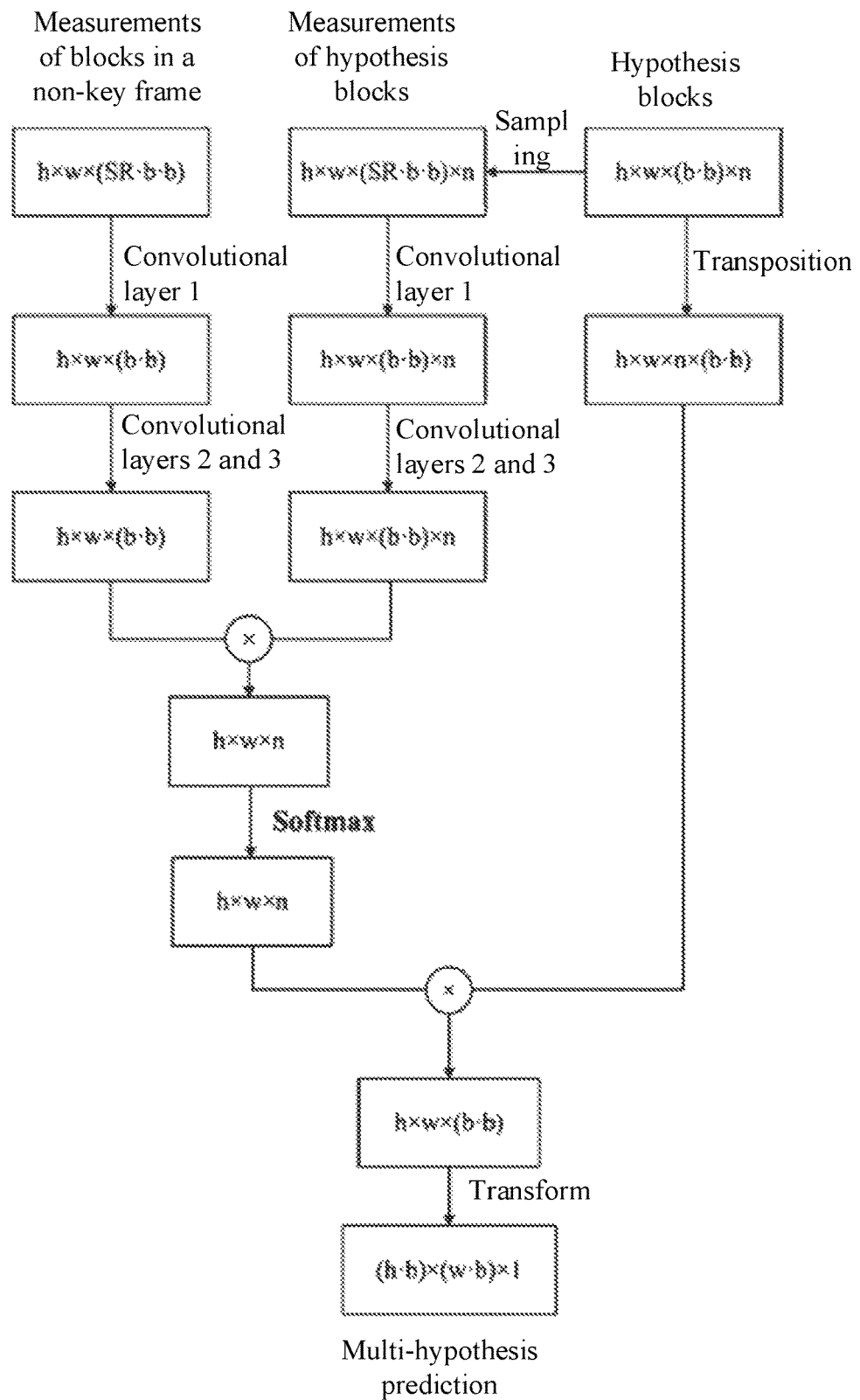
FIG. 4 is a flowchart of a multi-hypothesis prediction module according to an embodiment of the present disclosure.

(5) Construct a multi-hypothesis prediction module of the CVS network, as shown in FIG. 4. This module divides the non-key frame into a plurality of b×b image blocks that do not overlap each other, and predicts each image block by using a linear combination of hypothesis blocks corresponding to the image block. Specifically, a prediction of each image block is calculated according to the following formula:

$$P_i = \sum_{\forall j} \omega_{i,j} h_{i,j} \quad (1)$$

$$= \frac{1}{\sum_{\forall j} e^{p(q_{i,j})^T p(y_i)}} \sum_{\forall j} e^{p(q_{i,j})^T p(y_i)} h_{i,j}$$

In the foregoing formula, $P_i$ represents a prediction result of the $i^{th}$ image block in a current non-key frame, $h_{i,j}$ represents the $j^{th}$ hypothesis block of the $i^{th}$ image block, $\omega_{i,j}$ represents a weight of the hypothesis block, and is a function related to measurements of the image block and the hypothesis block, $q_{i,j}$ represents measurements obtained by sampling the hypothesis block in the sampling manner described in the step (4), $y_i$ represents the measurements of the $i^{th}$ image block, and $p(\bullet)$ represents a nonlinear mapping.

In a specific embodiment, the weight $\omega_{i,j}$ of the hypothesis block may be obtained by using the following function:

$$\omega_{i,j} = \frac{f(q_{i,j}, y_i)}{\sum_{\forall j} f(q_{i,j}, y_i)}$$

In the foregoing function, $f(q_{i,j}, y_i)$ is a function related to $q_{i,j}$ and $y_i$.

The foregoing function can be implemented in a plurality of manners. Preferably, in a specific embodiment, a weight $\omega_{i,j}$ of each hypothesis block is determined by an embedded Gaussian function, and is specifically obtained according to the following formula:

$$\omega_{i,j} = \frac{e^{p(q_{i,j})^T p(y_i)}}{\sum_{\forall j} e^{p(q_{i,j})^T p(y_i)}} \quad (2)$$

Figure 3:
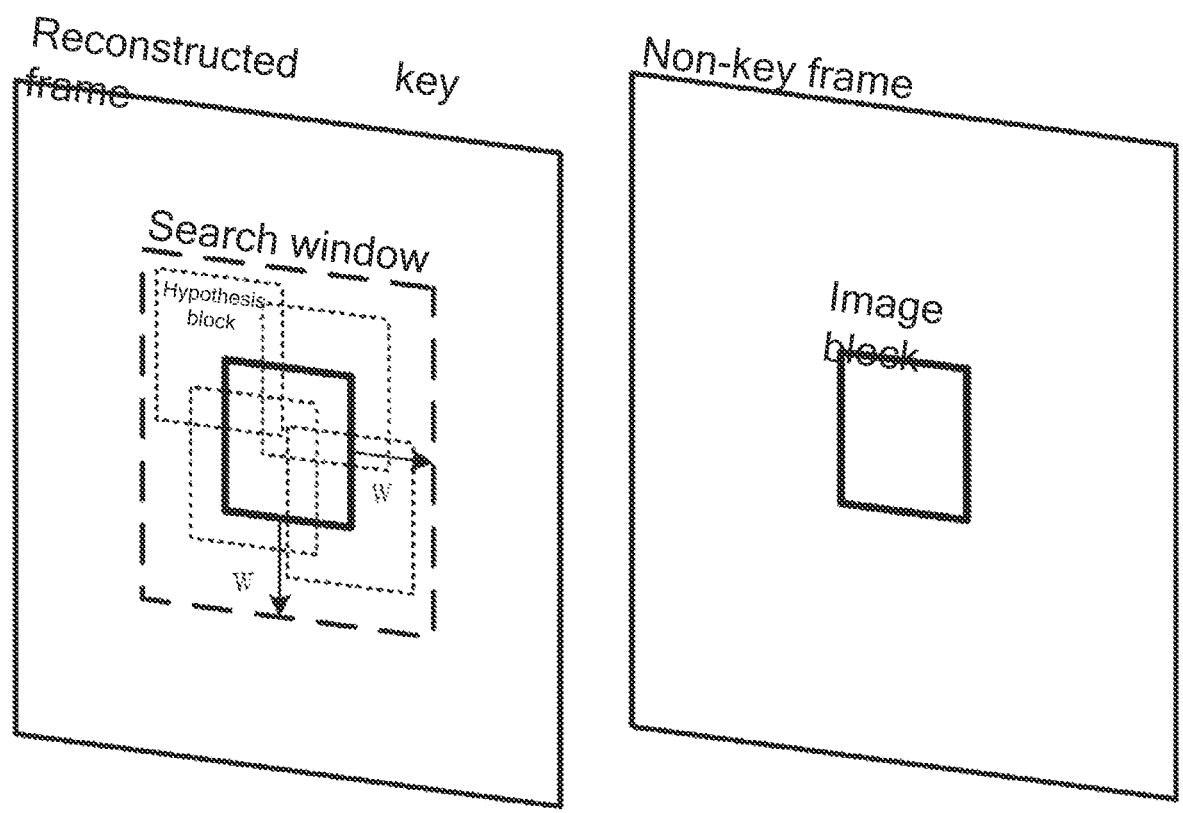
FIG. 3 is a schematic diagram of a hypothesis block in a key frame according to an embodiment of the present disclosure.

In this network, the formula (1) is specifically implemented as follows:

(a) Extract a set of hypothesis blocks from a reconstructed key frame in the step (3). Specifically, as shown in FIG. 3, for each image block in the non-key frame, a W×W rectangular search window centered on a position of the image block is determined in the key frame, and all overlapping image blocks in the search window are extracted as hypothesis blocks of a current image block. All hypothesis blocks of each image block in the non-key frame are combined to obtain an h×w×(b·b)×n hypothesis block tensor, where n represents the number of hypothesis blocks corresponding to each image block, h×w represents the number of to-be-predicted image blocks, and b·b represents dimensions of a hypothesis block.

(b) Sample, by using the adaptive sampling method in the step (4), the hypothesis block tensor obtained in the step (a), to obtain an h×w×(SR·b·b)×n tensor including measurements of all hypothesis blocks of each image block, where SR·b·b represents dimensions of the measurements $q_{(i,j)}$ of the hypothesis block.

(c) Use three convolutional layers to implement the p($\bullet$) function. The three convolutional layers each have a 1×1 convolution kernel and b·b output channels, and the first convolutional layer has SR·b·b input channels and the other convolutional layers each have b=b input channels.

(d) Convert, by using the p($\bullet$) function, the tensor that includes the measurements of the hypothesis blocks and that is obtained in the step (b) into an h×w×(b·b)×n feature map.

(e) Perform, by using the p($\bullet$) function, convolution on the h×w×(SR·b·b) tensor that is of the measurements of the non-key frame and that is obtained in the step (4), to obtain an h×w×(b·b) feature map.

(f) Perform matrix multiplication on the feature map obtained in the step (d) and the feature map obtained in the step (e), to implement $p(q_{i,j})$ T $p(y_i)$ in the formula (1) to obtain an h×w×n tensor.

(g) Normalize, by using a softmax function, the last dimension of the tensor obtained in the step (e), to implement $$\frac{1}{\sum_{\forall j} e^{p(q_{i,j})^T p(y_i)}} \sum_{\forall j} e^{p(q_{i,j})^T p(y_i)} h_{i,j}$$

in the formula (1) to obtain an h×w×n coefficient tensor.

(h) Perform matrix multiplication on the coefficient tensor obtained in the step (g) and the hypothesis block tensor obtained in the step (a), to obtain an h×w×(b·b) prediction tensor.

(i) Transform the prediction tensor obtained in the step (h), to obtain an (h·b)×(w·b) multi-hypothesis predicted image of the current non-key frame.

Figure 5:
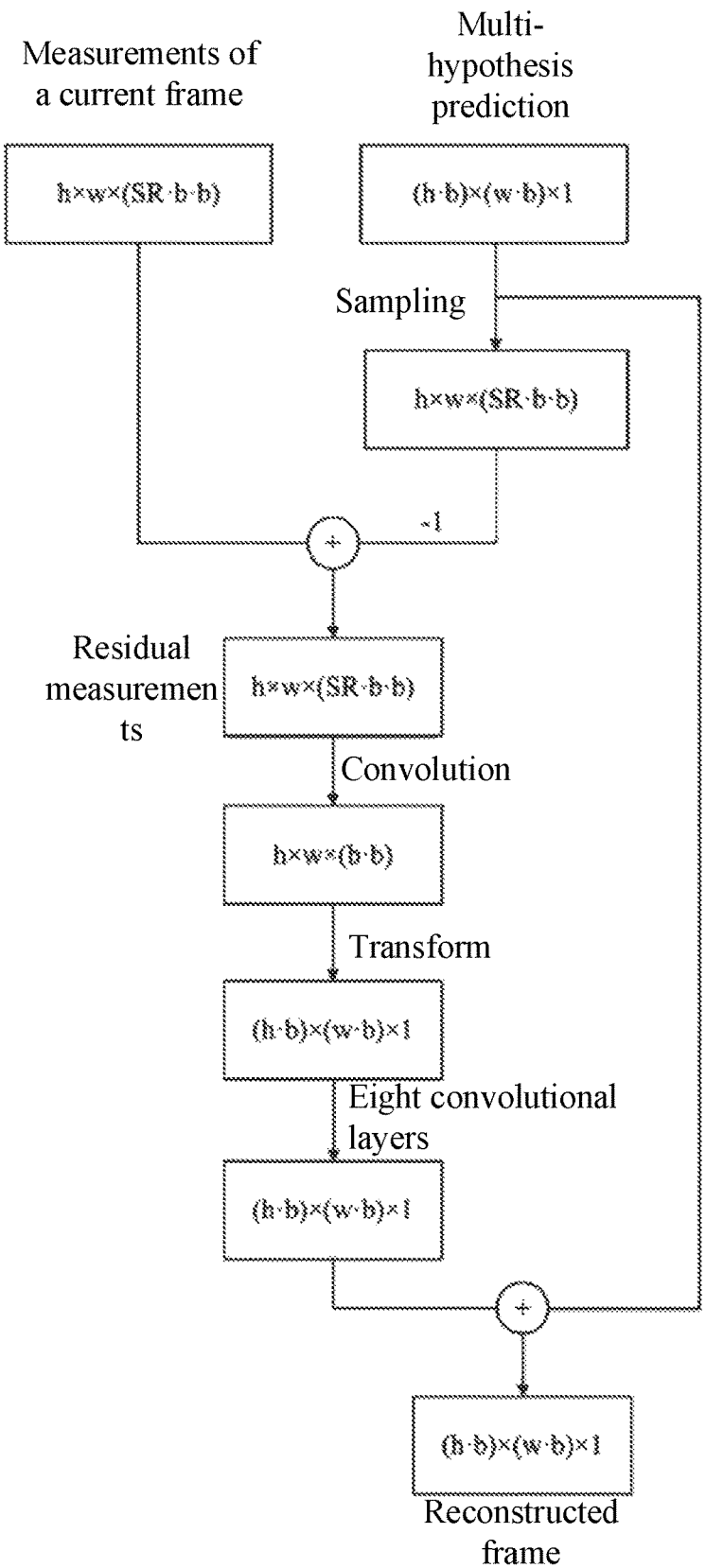
FIG. 5 is a flowchart of a residual reconstruction module according to an embodiment of the present disclosure.

(6) Construct a residual reconstruction module of the CVS network, as shown in FIG. 5. This module is configured to perform reconstruction to obtain a residual value between the original non-key frame and the multi-hypothesis predicted image obtained in the step (5). A residual signal has lower energy than an image signal, and therefore can be more easily reconstructed. The residual reconstruction module is specifically implemented as follows:

(a) Sample, by using the method in the step (4), the multi-hypothesis predicted image obtained in the step (5), to obtain h×w×(SR·b·b) measurements of the multi-hypothesis predicted image.

(b) Perform subtraction on the multi-hypothesis measurements obtained in the step (a) and the measurements that are of the non-key frame and that are obtained in the step (4), to obtain residual measurements.

(c) Convert the residual measurements into an h×w×(b·b) feature map by using one convolutional layer. The convolutional layer has a 1×1 convolution kernel, SR·b·b input channels, and b·b output channels.

(d) Transform the feature map output in the step (c), to obtain an (h·b)×(w·b) feature map.

(e) Preferably, perform, by using eight convolutional layers, convolution on the feature map obtained in the step (d), to obtain a reconstruction result of a residual image. The eight convolutional layers each have a 3×3 convolution kernel, the first convolutional layer has one input channel and the other convolutional layers each have 64 input channels, and the last convolutional layer has one output channel and the other convolutional layers each have 64 output channels.

(f) Add the residual reconstruction result obtained in the step (e) and the multi-hypothesis prediction result obtained in the step (5), to output a final reconstruction value of the non-key frame.

(7) Cascade the adaptive sampling module in the step (4) and the multi-hypothesis prediction module in the step (5) to constitute a sub-network. The network uses the original non-key frame and the reconstructed key frame in the step (3) as inputs, and the multi-hypothesis predicted image as an output. Initial parameters of all layers of the network are set to random values in pre-training. During training, a mean-square error is used as a loss function, and a label is an image of a real video frame.

(8) Train the entire network by using, as initial values, parameters obtained through pre-training in the step (7), and design the loss function to reduce a loss value in a training process, to obtain a trained network. During training, the mean-square error is used as the loss function.

(9) Use a trained network in the step (8) in an actual WVSN system to reconstruct a video signal. A specific implementation method includes the following steps:

(a) Separately reconstruct a key frame of a video sequence by using the method in the step (2).

(b) Reconstruct a non-key frame of the video sequence by using the trained network in the step (8).

(c) Arrange a reconstructed key frame in the step (a) and a reconstructed non-key frame in the step (b) in sequence, to obtain a reconstructed video signal.

The following provides further description based on the effects of the method in the present disclosure.

Table 1 compares reconstruction quality of the non-key frame in the embodiments of the present disclosure and the prior art.

TABLE 1

| Method | SR | | |
|---|---|---|---|
| | 0.01 | 0.04 | 0.10 |
| D-AMP | 6.20 | 13.85 | 26.68 |
| ReconNet | 21.20 | 24.27 | 27.45 |
| DR2-Net | 21.67 | 25.79 | 29.64 |
| MH-BCS-SPL | 24.36 | 28.60 | 31.31 |
| Method in the present disclosure | 28.36 | 32.82 | 36.09 |

A measurement criterion is a peak signal to noise ratio (PSNR), tested objects are 100 video sequences with seven frames as a GOP, and SRs of the non-key frame are 0.01, 0.04, and 0.10.

Table 1 shows that reconstruction quality of the method in the present disclosure is obviously better than existing methods. Compared with the existing best method (MH-BCS-SPL, a conventional block sampling-based multi-hypothesis prediction method), the method in the present disclosure improves the PSNR by 4 dB when the SR is 0.01, 4.22 dB when the SR is 0.04, and 4.78 dB when the SR is 0.10.

Table 2 compares average reconstruction times of a single non-key frame in the embodiments of the present disclosure and the prior art.

TABLE 2

| Method | SR | | |
|---|---|---|---|
| | 0.01 | 0.04 | 0.10 |
| D-AMP | 57.9816 | 58.9956 | 50.0234 |
| ReconNet | 0.0101 | 0.0101 | 0.0101 |
| DR2-Net | 0.0225 | 0.0226 | 0.0233 |
| MH-BCS-SPL | 4.7552 | 4.8278 | 4.7085 |
| Method in the present disclosure | 0.0241 | 0.0251 | 0.025 |

A time unit is second (s), tested objects are 100 video sequences with seven frames as a GOP, and the SRs of the non-key frame are 0.01, 0.04, and 0.10.

Table 2 shows that the reconstruction time of the method in the present disclosure is in a same order of magnitude as the reconstruction times of the DNN-based ReconNet and DR 2-Net methods, and is two orders of magnitude shorter than the reconstruction time of the MH-BCS-SPL method, and is three orders of magnitude shorter than the reconstruction time of the D-AMP method. Therefore, the method in the present disclosure supports a currently leading reconstruction speed, and is applicable to a real-time video sensing system.

The method in the present disclosure divides the video signal into the key frame and the non-key frame. The key frame is reconstructed by using the existing image reconstruction method. In this method, a special DNN is proposed to reconstruct the non-key frame. The neural network includes the adaptive sampling module, the multi-hypothesis prediction module, and the residual reconstruction module. The neural network makes full use of a spatio-temporal correlation of the video signal to sample and reconstruct the video signal. This ensures low time complexity of an algorithm while improving reconstruction quality. Therefore, the method in the present disclosure is applicable to a video sensing system with limited resources on a sampling side and high requirements for reconstruction quality and real-time performance.

In the method in the present disclosure, the adaptive sampling module, the multi-hypothesis prediction module, and the residual reconstruction module are designed based on the DNN. The three modules make full use of the spatio-temporal correlation of the video signal to sample and reconstruct the non-key frame. This ensures the low time complexity of the algorithm. Therefore, the method in the present disclosure is applicable to the video sensing system with the limited resources on the sampling side and the high requirements for the reconstruction quality and the real-time performance.

Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program codes.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The embodiments of the present disclosure are described above with reference to the accompanying drawings, but the present disclosure is not limited to the above specific implementations. The above specific implementations are merely illustrative and not restrictive. Those of ordinary skill in the art may make modifications to the present disclosure without departing from the purpose of the present disclosure and the scope of protection of the claims, but these modifications should all fall within the protection of the present disclosure.

It should be understood that in the description of the disclosure, terms such as "inner side", "outer side", "upper" "top", "lower", "left", "right", "vertical", "horizontal", "parallel", "bottom", "inside" and "outside" indicate the orientation or position relationships based on the drawings. They are merely intended to facilitate description of the disclosure, rather than to indicate or imply that the mentioned apparatus or elements must have a specific orientation and must be constructed and operated in a specific orientation. Therefore, these terms should not be construed as a limitation on the disclosure.

In this specification, several specific examples are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and scope of application in accordance with the ideas of the present disclosure. In conclusion, the content of this specification shall not be construed as a limitation on the present disclosure.

What is claimed is:

1. A deep neural network (DNN)-based reconstruction method for compressive video sensing (CVS), comprising:
    inputting a video sequence used for network training; dividing the video sequence into a plurality of groups of pictures (GOP), and determining a key frame and a non-key frame for each GOP; reconstructing the key frame by using a CVS reconstruction method, to obtain a reconstructed key frame; and dividing the non-key frame into a plurality of image blocks that do not overlap each other;
    performing adaptive sampling on each image block in the non-key frame, to obtain measurements of the image block;
    determining a hypothesis block corresponding to each image block, performing adaptive sampling on each image block in the non-key frame by using a corresponding hypothesis block, to obtain measurements of the hypothesis block, and calculating a prediction of each image block based on the measurements of the hypothesis block and the measurements of the image block to obtain a multi-hypothesis predicted image;
    performing adaptive sampling on the multi-hypothesis predicted image, constructing residual measurements between measurements of the multi-hypothesis predicted image and measurements of the non-key frame, and obtaining a reconstructed non-key frame based on the residual measurements by using a residual reconstruction method;
    constructing a sub-network, training the sub-network, and training the entire DNN by using, as initial values, parameters obtained through sub-network pre-training, to obtain a trained DNN;
    inputting a video sequence, dividing the video sequence into a plurality of GOPs, determining a key frame and a non-key frame for each GOP, and reconstructing the key frame to obtain a reconstructed key frame;
    reconstructing the non-key frame of the video sequence by using the trained DNN; and
    arranging, in sequence, the reconstructed key frame and a reconstructed non-key frame output by the DNN, to obtain a reconstructed video signal.

2. The DNN-based reconstruction method for CVS according to claim 1, wherein the determining a hypothesis block corresponding to each image block specifically comprises:
    for each b·b image block in the non-key frame, determining, in the key frame, a W×W rectangular search window centered on a position of the b·b image block, extracting, as hypothesis blocks of a current image block, all overlapping image blocks in the search window, and combining all hypothesis blocks of each image block in the non-key frame to obtain an h×w×(b·b)×n hypothesis block tensor, wherein n represents the number of hypothesis blocks corresponding to each image block, h×w represents the number of to-be-predicted image blocks, and b·b represents dimensions of a hypothesis block.

3. The DNN-based reconstruction method for CVS according to claim 2, wherein the prediction of each image block is calculated according to the following formula:

$$P_i = \sum_{\forall j} \omega_{i,j} h_{i,j} \quad (1)$$

$$= \frac{1}{\sum_{\forall j} e^{p(q_{i,j})^T p(y_i)}} \sum_{\forall j} e^{p(q_{i,j})^T p(y_i)} h_{i,j}$$

wherein $P_i$ represents a prediction result of an $i^{th}$ image block in a current non-key frame, $h_{i,j}$ represents a $j^{th}$ hypothesis block of the $i^{th}$ image block, $\omega_{i,j}$ represents a weight of the hypothesis block, $q_{i,j}$ represents a sampling result obtained by performing adaptive sampling on the hypothesis block, $y_i$ represents a value of adaptive sampling of the $i^{th}$ image block, and $p(\bullet)$ represents a nonlinear mapping function used to convert low-dimensional measurements into high-dimensional measurements.

4. The DNN-based reconstruction method for CVS according to claim 3, wherein the formula (1) is specifically implemented as follows:
    performing adaptive sampling on the hypothesis block tensor to obtain an h×w×(sampling rate (SR)·b·b)×n tensor comprising measurements $q_{i,j}$ of all hypothesis blocks of each image block, wherein SR·b·b represents dimensions of the measurements $q_{i,j}$ of the hypothesis block;
    implementing the p(•) function by using three convolutional layers, wherein the three convolutional layers each have a 1×1 convolution kernel and b·b output channels, and the first convolutional layer has SR·b·b input channels and the other convolutional layers each have b·b input channels;
    converting, by using the p(•) function, the obtained tensor comprising the measurements of the hypothesis blocks into an h×w×(b·b)×n hypothesis block feature map;

performing, by using the p(•) function, convolution on an obtained h×w×(SR·b·b) tensor of the measurements of the non-key frame, to obtain an h×w×(b·b) non-key frame feature map;

performing matrix multiplication on the obtained hypothesis block feature map and the obtained non-key frame feature map to implement $$e^{p(q_{i,j})^T p(y_i)}$$

in the formula (1), to obtain an h×w×n tensor, normalizing, by using a softmax function, the last dimension of the obtained tensor to implement $$\frac{1}{\sum_{\forall j} e^{p(q_{i,j})^T p(y_i)}} \sum_{\forall j} e^{p(q_{i,j})^T p(y_i)}$$

in the formula (1), to obtain an h×w×n coefficient tensor;
performing matrix multiplication on the obtained coefficient tensor and the obtained hypothesis block tensor to obtain an h×w×(b·b) prediction tensor; and
transforming the obtained prediction tensor to obtain an (h·b)×(w·b) multi-hypothesis predicted image of the current non-key frame.

5. The DNN-based reconstruction method for CVS according to claim 3, wherein a weight of each hypothesis block is determined by an embedded Gaussian function, and is specifically obtained according to the following formula:

$$\omega_{i,j} = \frac{e^{p(q_{i,j})^T p(y_i)}}{\sum_{\forall j} e^{p(q_{i,j})^T p(y_i)}}. \tag{2}$$

6. The DNN-based reconstruction method for CVS according to claim 1, wherein the performing adaptive sampling on the multi-hypothesis predicted image, constructing residual measurements between measurements of the multi-hypothesis predicted image and measurements of the non-key frame, and obtaining the reconstructed non-key frame based on the residual measurements by using the residual reconstruction method specifically comprise:

performing adaptive sampling on the multi-hypothesis predicted image to obtain h×w×(SR·b·b) measurements of the multi-hypothesis predicted image, wherein h×w×(SR·b·b) is dimensions of measurements of the multi-hypothesis predicted image;

performing subtraction on the multi-hypothesis measurements and the measurements that are of the non-key frame and that are obtained based on the measurements of the image block, to obtain residual measurements;

converting the residual measurements into an h×w×(b·b) feature map by using one convolutional layer, wherein the convolutional layer has a 1×1 convolution kernel, SR·b·b input channels, and b·b output channels, wherein h×w×(b·b) is dimensions of the output feature map;

transforming the output feature map to obtain an (h·b)×(w·b) feature map, wherein (h·b)×(w·b) is dimensions of the output feature map after transforming;

performing convolution on the obtained feature map by using a convolutional layer to obtain a reconstruction result of a residual image; and adding the obtained residual reconstruction result and the multi-hypothesis predicted image to output a final reconstruction value of the non-key frame.

7. The DNN-based reconstruction method for CVS according to claim 6, wherein performing convolution on the obtained feature map by using eight convolutional layers, to obtain the reconstruction result of the residual image, wherein the eight convolutional layers each have a 3×3 convolution kernel, the first convolutional layer has one input channel and the other convolutional layers each have 64 input channels, and the last convolutional layer has one output channel and the other convolutional layers each have 64 output channels.

8. The DNN-based reconstruction method for CVS according to claim 1, wherein an adaptive sampling method is as follows: sampling a signal according to the following formula:

$$y = \Phi x \tag{3}$$

wherein y represents a vector of measurements, Φ represents a sampling matrix, and x represents an original signal; the formula (3) is implemented by using one convolutional layer, and the convolutional layer has a b×b convolution kernel, one input channel, and SR·b·b output channels, wherein the SR indicates an SR of the non-key frame, and SR·b·b indicates the number of output channels; and the convolutional layer is equivalent to performing compressive sensing-based sampling on each b×b image block in an image to output an h×w×(SR·b·b) tensor, wherein h and w represent quantities of blocks of the input image in height and width dimensions respectively, and weights of the convolutional layer are a corresponding sampling matrix.

9. A deep neural network (DNN-based) apparatus for compressive video sensing (CVS), comprising:
at least one processor; and
a memory stored with instructions that, when executed by the at least one processor, cause the at least one processor to execute operations comprising:
inputting a video sequence;
dividing the video sequence input into a plurality of groups of pictures (GOPs), and determining a key frame and a non-key frame for each GOP;
reconstructing the non-key frame to obtain a reconstructed non-key frame;
reconstructing, by using a CVS reconstruction method, the key frame to obtain a reconstructed key frame;
arranging, in sequence, the reconstructed key frame and the reconstructed non-key frame, to obtain a reconstructed video signal;
inputting a training-specific video sequence;
dividing the training-specific video sequence into a plurality of GOPs, and determining a key frame and a non-key frame for each GOP;
dividing the non-key frame that is of the training-specific video sequence into a plurality of image blocks that do not overlap each other;
performing adaptive sampling on each image block in the non-key frame, to obtain measurements of the image block;
determining a hypothesis block corresponding to each image block, performing adaptive sampling on each image block in the non-key frame by using a corresponding hypothesis block, to obtain measurements of the hypothesis block, and obtaining a multi-hypothesis predicted image based on the measurements of the hypothesis block and the measurements of the image block;

performing adaptive sampling on the multi-hypothesis predicted image, construct residual measurements between measurements of the multi-hypothesis predicted image and measurements of the non-key frame, and obtaining a reconstructed non-key frame based on the residual measurements by using a residual reconstruction method;

constructing a sub-network, and training the sub-network; and training the entire DNN by using, as initial values, parameters obtained through sub-network pre-training, to obtain a trained DNN.

10. The DNN-based reconstruction method for CVS according to claim 2, wherein an adaptive sampling method is as follows: sampling a signal according to the following formula:

$$y = \Phi x \qquad (3)$$

wherein y represents a vector of measurements, $\Phi$ represents a sampling matrix, and x represents an original signal; the formula (3) is implemented by using one convolutional layer, and the convolutional layer has a b×b convolution kernel, one input channel, and SR·b·b output channels, wherein the SR indicates an SR of the non-key frame, and SR·b·b indicates the number of output channels; and the convolutional layer is equivalent to performing compressive sensing-based sampling on each b×b image block in an image to output an h×w×(SR·b·b) tensor, wherein h and w represent quantities of blocks of the input image in height and width dimensions respectively, and weights of the convolutional layer are a corresponding sampling matrix.

11. The DNN-based reconstruction method for CVS according to claim 3, wherein an adaptive sampling method is as follows: sampling a signal according to the following formula:

$$y = \Phi x \qquad (3)$$

wherein y represents a vector of measurements, $\Phi$ represents a sampling matrix, and x represents an original signal; the formula (3) is implemented by using one convolutional layer, and the convolutional layer has a b×b convolution kernel, one input channel, and SR·b·b output channels, wherein the SR indicates an SR of the non-key frame, and SR·b·b indicates the number of output channels; and the convolutional layer is equivalent to performing compressive sensing-based sampling on each b×b image block in an image to output an h×w×(SR·b·b) tensor, wherein h and w represent quantities of blocks of the input image in height and width dimensions respectively, and weights of the convolutional layer are a corresponding sampling matrix.

12. The DNN-based reconstruction method for CVS according to claim 4, wherein an adaptive sampling method is as follows: sampling a signal according to the following formula:

$$y = \Phi x \qquad (3)$$

wherein y represents a vector of measurements, $\Phi$ represents a sampling matrix, and x represents an original signal; the formula (3) is implemented by using one convolutional layer, and the convolutional layer has a b×b convolution kernel, one input channel, and SR·b·b output channels, wherein the SR indicates an SR of the non-key frame, and SR·b·b indicates the number of output channels; and the convolutional layer is equivalent to performing compressive sensing-based sampling on each b×b image block in an image to output an h×w×(SR·b·b) tensor, wherein h and w represent quantities of blocks of the input image in height and width dimensions respectively, and weights of the convolutional layer are a corresponding sampling matrix.

13. The DNN-based reconstruction method for CVS according to claim 5, wherein an adaptive sampling method is as follows: sampling a signal according to the following formula:

$$y = \Phi x \qquad (3)$$

wherein y represents a vector of measurements, $\Phi$ represents a sampling matrix, and x represents an original signal; the formula (3) is implemented by using one convolutional layer, and the convolutional layer has a b×b convolution kernel, one input channel, and SR·b·b output channels, wherein the SR indicates an SR of the non-key frame, and SR·b·b indicates the number of output channels; and the convolutional layer is equivalent to performing compressive sensing-based sampling on each b×b image block in an image to output an h×w×(SR·b·b) tensor, wherein h and w represent quantities of blocks of the input image in height and width dimensions respectively, and weights of the convolutional layer are a corresponding sampling matrix.

14. The DNN-based reconstruction method for CVS according to claim 6, wherein an adaptive sampling method is as follows: sampling a signal according to the following formula:

$$y = \Phi x \qquad (3)$$

wherein y represents a vector of measurements, $\Phi$ represents a sampling matrix, and x represents an original signal; the formula (3) is implemented by using one convolutional layer, and the convolutional layer has a b×b convolution kernel, one input channel, and SR·b·b output channels, wherein the SR indicates an SR of the non-key frame, and SR·b·b indicates the number of output channels; and the convolutional layer is equivalent to performing compressive sensing-based sampling on each b×b image block in an image to output an h×w×(SR·b·b) tensor, wherein h and w represent quantities of blocks of the input image in height and width dimensions respectively, and weights of the convolutional layer are a corresponding sampling matrix.

15. The DNN-based reconstruction method for CVS according to claim 7, wherein an adaptive sampling method is as follows: sampling a signal according to the following formula:

$$y = \Phi x \qquad (3)$$

wherein y represents a vector of measurements, $\Phi$ represents a sampling matrix, and x represents an original signal; the formula (3) is implemented by using one convolutional layer, and the convolutional layer has a b×b convolution kernel, one input channel, and SR·b·b output channels, wherein the SR indicates an SR of the non-key frame, and SR·b·b indicates the number of output channels; and the convolutional layer is equivalent to performing compressive sensing-based sampling on each b×b image block in an image to output an h×w×(SR·b·b) tensor, wherein h and w represent quantities of blocks of the input image in height and width dimensions respectively, and weights of the convolutional layer are a corresponding sampling matrix.

* * * * *